United States Patent
Sakamoto et al.

(10) Patent No.: US 12,475,646 B2
(45) Date of Patent: Nov. 18, 2025

(54) MAP GENERATION BASED ON CHANGE POINTS IN SATELLITE IMAGES

(71) Applicant: TOYOTA JIDOSHA KABUSHIKI KAISHA, Toyota (JP)

(72) Inventors: Shoji Sakamoto, Shizuoka-ken (JP);
Kazumi Tsuchiya, Gotemba (JP);
Makoto Matsushita, Ichinomiya (JP);
Takeshi Takemoto, Nagoya (JP);
Shunsuke Sagara, Nisshin (JP);
Hideaki Shiraishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 18/472,685

(22) Filed: Sep. 22, 2023

(65) Prior Publication Data

US 2024/0185521 A1 Jun. 6, 2024

(30) Foreign Application Priority Data

Dec. 2, 2022 (JP) ................................ 2022-193802

(51) Int. Cl.
*G06T 17/05* (2011.01)
*G06T 7/00* (2017.01)
*G06T 7/70* (2017.01)

(52) U.S. Cl.
CPC ............... *G06T 17/05* (2013.01); *G06T 7/70* (2017.01); *G06T 7/97* (2017.01); *G06T 2207/10032* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,470,265 B1 | 10/2002 | Tanaka | |
| 2015/0264554 A1* | 9/2015 | Addepalli | H04W 76/45 370/328 |
| 2018/0180476 A1* | 6/2018 | Richarte | G01J 3/2803 |
| 2018/0239982 A1* | 8/2018 | Rutschman | G06V 10/147 |
| 2019/0088114 A1* | 3/2019 | Kumhyr | G08G 1/0112 |
| 2020/0307616 A1* | 10/2020 | Nithiyanantham | G02B 27/0093 |
| 2021/0027618 A1* | 1/2021 | Sugimoto | G08G 1/0129 |
| 2021/0056847 A1* | 2/2021 | Saxena | G08G 1/04 |
| 2022/0307860 A1 | 9/2022 | Okuma | |

FOREIGN PATENT DOCUMENTS

| | | |
|---|---|---|
| JP | H11-184375 A | 7/1999 |
| JP | 2007-271397 A | 10/2007 |
| JP | 2015-105833 A | 6/2015 |
| JP | 2018-106035 A | 7/2018 |
| JP | 2021-167844 A | 10/2021 |
| JP | 2022-542289 A | 9/2022 |
| JP | 2022-149051 A | 10/2022 |
| JP | 2022-151339 A | 10/2022 |

* cited by examiner

*Primary Examiner* — Zhengxi Liu
(74) *Attorney, Agent, or Firm* — SoraIP, Inc.

(57) ABSTRACT

The map generation device includes a satellite image acquisition unit that acquires a satellite image captured by an artificial satellite, a change point determination unit that determines a change point of the satellite image with time based on the satellite image, and a map generation unit that generates a map based on information of the determined change point. Based on the satellite images, the usage status of the parking lot is reflected in the map.

5 Claims, 4 Drawing Sheets

MAP GENERATION BASED ON CHANGE POINTS IN SATELLITE IMAGES

CROSS-REFERENCE TO RELATED APPLICATION

This application claims priority to Japanese Patent Application No. 2022-193802 filed on Dec. 2, 2022, incorporated herein by reference in its entirety.

BACKGROUND

1. Technical Field

The present disclosure relates to a map generation device.

2. Description of Related Art

Japanese Unexamined Patent Application Publication No. 2007-271397 (JP 2007-271397 A) discloses a configuration of drawing a different parking lot position mark according to the congestion state on a map image and displaying it on a display device, based on parking lot information including identification information and the congestion state of the parking lot. This makes it possible to easily grasp the usage status of the parking lot near the vehicle.

SUMMARY

In the map generation device, it is preferable to generate a latest map by a simple method.

An object of the present disclosure is to obtain a map generation device capable of creating a latest map by a simple method.

A map generation device according to claim 1 includes: a satellite image acquisition unit for acquiring a satellite image captured by an artificial satellite; a change point determination unit for determining a change point with time in the satellite image based on the satellite image; and a map generation unit for generating a map based on information of the determined change point.

Since the map generation device according to claim 1 includes the map generation unit for generating a map based on information of a change point with time in the satellite image, the change point with time that has been specified based on the satellite image is incorporated in the map. Therefore, a map incorporating the change point is generated in real time. As a result, a latest map can be created by a simple method.

The map generation device according to claim 2 further includes, in the map generation device according to claim 1: a parking lot specification unit for specifying a parking lot based on the satellite image; and a vehicle specification unit for specifying a vehicle based on the satellite image. The change point determination unit determines a usage state of the parking lot as the change point with time in the satellite image based on the specified parking lot and the specified vehicle.

In the map generation device according to claim 2, the change point determination unit determines the usage state of the parking lot as a change point with time in the satellite image based on the specified parking lot and the specified vehicle, so that the usage state of the parking lot is incorporated in the map based on the satellite image. Therefore, it is possible to generate a map incorporating the usage state of the facility related to the parking lot in real time.

The map generation device according to claim 3 further includes, in the map generation device according to claim 1 or 2, a character figure information specification unit for specifying character figure information based on the satellite image. The change point determination unit determines a change in the character figure information as the change point with time in the satellite image based on the specified character figure information.

In the map generation device according to claim 3, the change point determination unit determines a change in the character figure information as the change point with time in the satellite image based on the specified character figure information, so that the information of the facility corresponding to the character figure information of the change point is incorporated in the map. Therefore, the map can be made to incorporate the information of the facility in real time. As a result, a latest map can be created by a simple method.

The map generation device according to claim 4 further includes, in the map generation device according to any one of claims 1 to 3: a vehicle travel data acquisition unit for acquiring vehicle travel data; and a visit information acquisition unit for acquiring visit information to a facility based on the vehicle travel data. The map generation unit generates the map based on the visit information.

In the map generation device according to claim 4, the map generation unit generates a map based on the visit information, thereby generating a map in which a place where the vehicle frequently visits is incorporated. Therefore, the map can be made to incorporate a store that is opened. As a result, a more latest map can be created.

The map generation device according to claim 5 further includes, in the map generation device according to any one of claims 1 to 4: a position information acquisition unit for acquiring position information of the change point; a request unit for requesting, based on the position information, a vehicle around the change point to capture an image around the change point; and a camera image acquisition unit for acquiring a camera image of a camera mounted on the vehicle. The map generation unit generates, based on the information of the determined change point, the map in which the camera image is superimposed.

In the map generation device according to claim 5, the map generation unit generates a map in which the camera image is superimposed based on the information of the determined change point, thereby generating the map using the camera image of the change point. Therefore, a map incorporating the camera image of the change point is generated in real time. As a result, a latest map can be created by a simple method.

As described above, according to the map generation device of the present disclosure, it is possible to generate a latest map by a simple method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a map generation system 10 including the map generation device 20 according to the first embodiment will be described with reference to the drawings. In the map generation system 10 according to the first embodiment, an example in which a map reflecting fresh information is generated based on a satellite image acquired from the artificial satellite 2 will be described. As a map, a 2D map and a street view map that provides a scene along a roadway in a panoramic photograph will be described.

[Configuration of Map Generation System 10]

Figure 1:
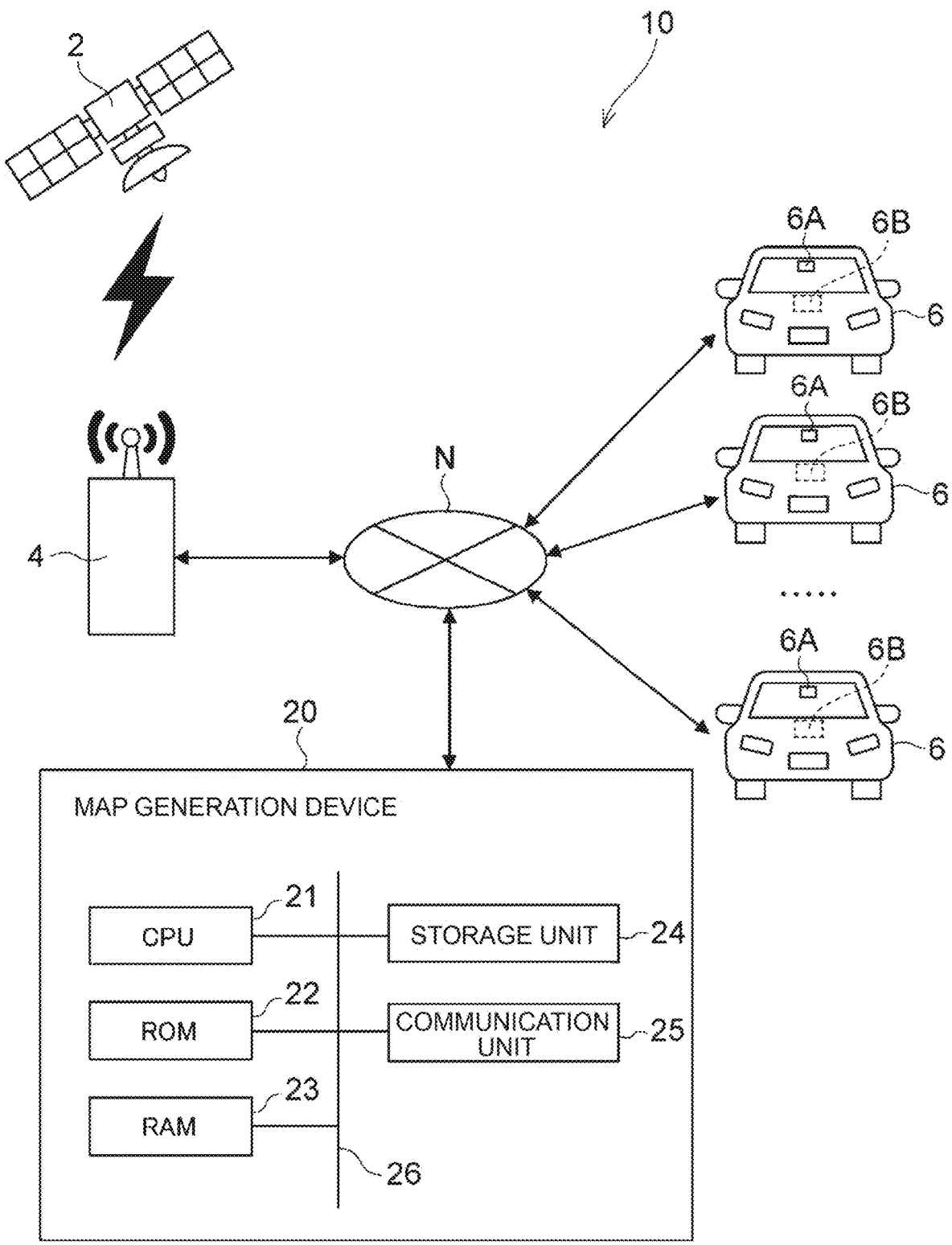
FIG. 1 is a schematic diagram schematically illustrating an entire system according to a first embodiment.

As illustrated in FIG. 1, the map generation system 10 includes an artificial satellite 2, a server 4, a plurality of vehicles 6, and a map generation device 20. The map generation device 20, the server 4, and the vehicles 6 are connected to each other via a network N and can communicate with each other.

(Satellite 2)

The artificial satellite 2 circulates on the satellite orbit of the earth at a predetermined cycle, and photographs the earth.

(Server 4)

The server 4 is a server computer, and acquires a satellite image captured by the satellite 2 from the satellite 2.

(Vehicle 6)

The vehicle 6 includes a camera 6A and a display device 6B. The camera 6A is configured to capture an image of the surroundings of the vehicle. The display device 6B may be a liquid crystal display provided in a vehicle cabin.

(Map Generation Device 20)

The map generation device 20 is installed outside the vehicle 6, for example. The map generation device 20 is configured to be able to acquire various kinds of information from the server 4 and the vehicle 6 via the network N.

[Hardware Configuration of Map Generation Device 20]

As illustrated in FIG. 1, the map generation device 20 includes a Central Processing Unit (CPU) 21, a Read Only Memory (ROM) 22, a Random Access Memory (RAM) 23, a storage unit 24, and a communication unit 25. The components are communicably connected to each other via a bus 26.

CPU 21 is a central processing unit that executes various programs and controls each unit. CPU 21 reads the program from ROM 22 or the storage unit 24, and executes the program using RAM 23 as a working area. CPU 21 performs control of the above-described configurations and various arithmetic processes in accordance with a ROM 22 or a program recorded in the storage unit 24.

ROM 22 stores various programs and various data. RAM 23 temporarily stores a program/data as a working area.

The storage unit 24 is configured by a storage device such as a Hard Disk Drive (HDD), Solid State Drive (SSD), or a flash memory, and stores various programs and various data. The storage unit 24 stores a program for executing a map generation process to be described later.

The communication unit 25 is an interface for communicating with the server 4, the vehicle 6, and other devices via the network N. As the communication by the communication unit 25, for example, standards such as Controller Area Network (CAN), Ethernet (registered trademark), Long Term Evolution (LTE), Fiber Distributed Data Interface (FDDI), and Wi-Fi (registered trademark) are used.

[Functional Configuration of Map Generation Device 20]

In the map generation device 20, the satellite images captured by the artificial satellites 2 are input to the control unit 30 via the network N, and the process information in which the map generation process is executed in the control unit 30 is output to the display device 6B of the vehicle 6 via the network N. In the control unit 30, CPU 21 executes a map generation process in accordance with a ROM 22 or a program recorded in the storage unit 24.

Figure 2:
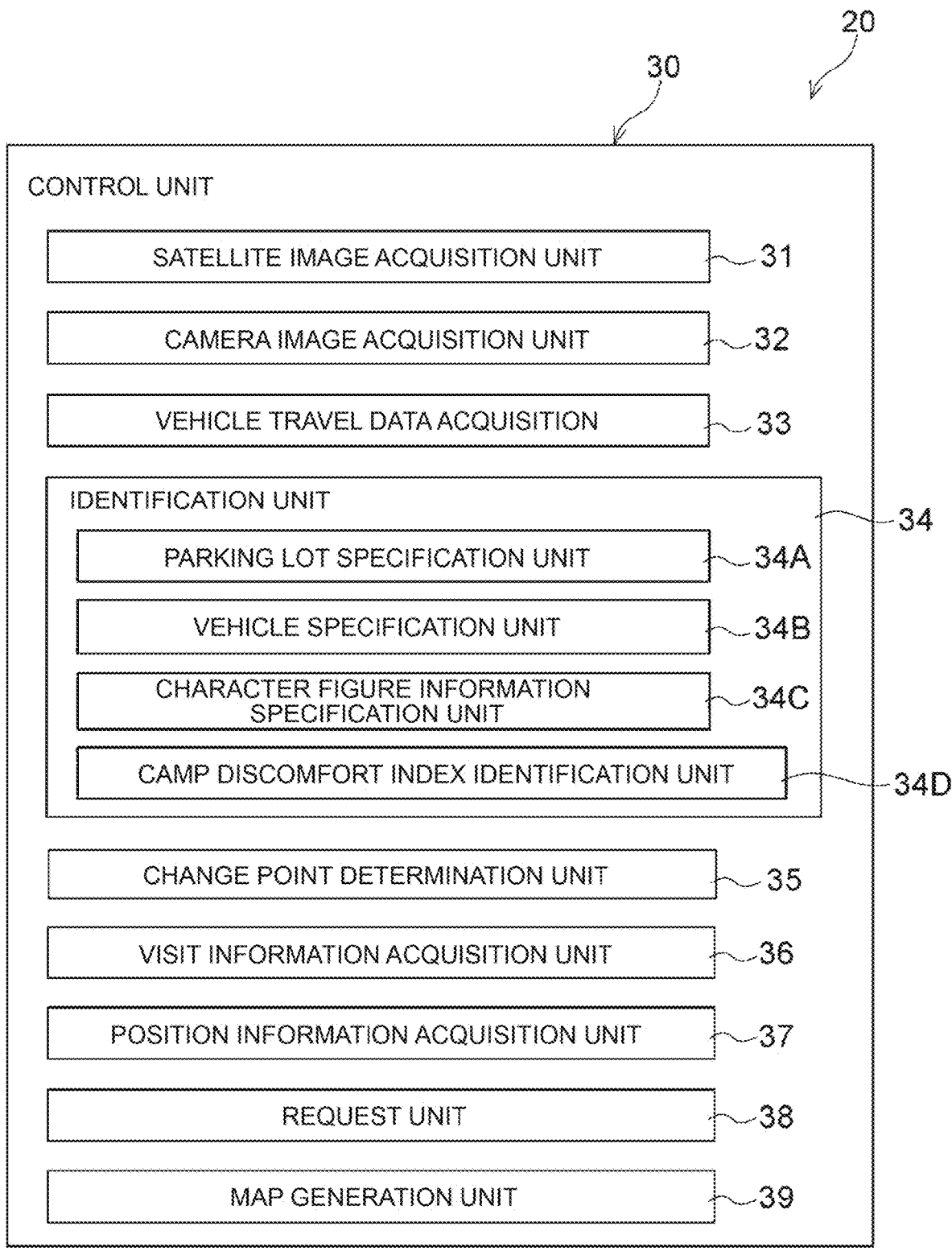
FIG. 2 is a block diagram illustrating a functional configuration of the map generation device according to the first embodiment.

As illustrated in FIG. 2, the control unit 30 functionally includes a satellite image acquisition unit 31, a camera image acquisition unit 32, a vehicle travel data acquisition unit 33, a specification unit 34, a change point determination unit 35, a visit information acquisition unit 36, a position information acquisition unit 37, a requesting unit 38, and a map generation unit 39.

The satellite image acquisition unit 31 acquires a satellite image captured by the satellite 2. It is assumed that the satellite image includes positional information such as latitude and longitude. The camera image acquisition unit 32 acquires a camera image captured by the camera 6A mounted on the vehicle 6 in response to a request from the requesting unit 38.

The vehicle travel data acquisition unit 33 acquires travel data of the vehicle 6.

The specification unit 34 includes a parking lot specification unit 34A, a vehicle specification unit 34B, a character figure information specification unit 34C, and a camp discomfort index specification unit 34D.

The parking lot specification unit 34A specifies the parking lot based on the satellite-based image, for example, by image recognition. The vehicle specification unit 34B identifies the vehicle based on the satellite-based image, for example, by image recognition.

The character figure information specification unit 34C specifies the character figure information based on the satellite image, for example, by image recognition.

The camp discomfort index specification unit 34D specifies the camp discomfort index based on the satellite image, for example, by image recognition. The camp discomfort index specification unit 34D may specify the camp discomfort index based on the weather data from the satellites 2. The camp discomfort index includes, for example, congestion conditions, vehicle spacing, presence or absence of tree shade, air temperature, humidity, soil moisture content, wind speed, weather information, and the like.

The change point determination unit 35 determines a change point of the satellite image with time based on the satellite image. For example, the change point determination unit 35 compares the past satellite image with the current satellite image to determine a change point in the current satellite image.

The change point determination unit 35 determines the usage status of the parking lot as a change point with time in the satellite-images based on the parking lot specified by the parking lot specification unit 34A and the vehicle specified by the vehicle specification unit 34B.

For example, in a case where the vehicle is not stopped in the parking lot and the vehicle is stopped in the parking lot in the current satellite image in the past satellite image, the change point determination unit 35 determines that the use state of the parking lot has changed, and determines that the parking lot has been used.

In the past satellite image, when the vehicle is stopped in the parking lot and the vehicle is not stopped in the parking lot in the current satellite image, the change point determination unit 35 determines that the use state of the parking lot has changed, and determines that the parking lot has not been used.

The change point determination unit may determine a change in the character figure information as a change point with time in the satellite image based on the identified character figure information. For example, when the character figure information is "Facility A" in the past satellite image and the character figure information is "Facility B" in the current satellite image, the change point determination unit 35 determines that the character figure information has changed, and determines that the character figure information has changed from "Facility A" to "Facility B".

In addition, the change point determination unit may determine the degree of discomfort of the camp as a change point with time in the satellite images based on the camp discomfort index acquired by the camp discomfort index specification unit 34D. For example, in a case where the camping place is congested, the vehicle interval is narrow, there is no shade, the camping place is not congested, the vehicle interval is wide, and there is shade in the current satellite image in the past satellite image, the change point determination unit 35 determines that the discomfort level of the camp has changed, and determines that the discomfort level of the camp has decreased.

The visit information acquisition unit 36 acquires visit information to the facility based on the vehicle travel data. The position information acquisition unit 37 acquires position information of a change point of the satellite image.

Based on the position information, the requesting unit 38 requests the vehicle 6 around the change point to capture an image around the change point.

Figure 4:
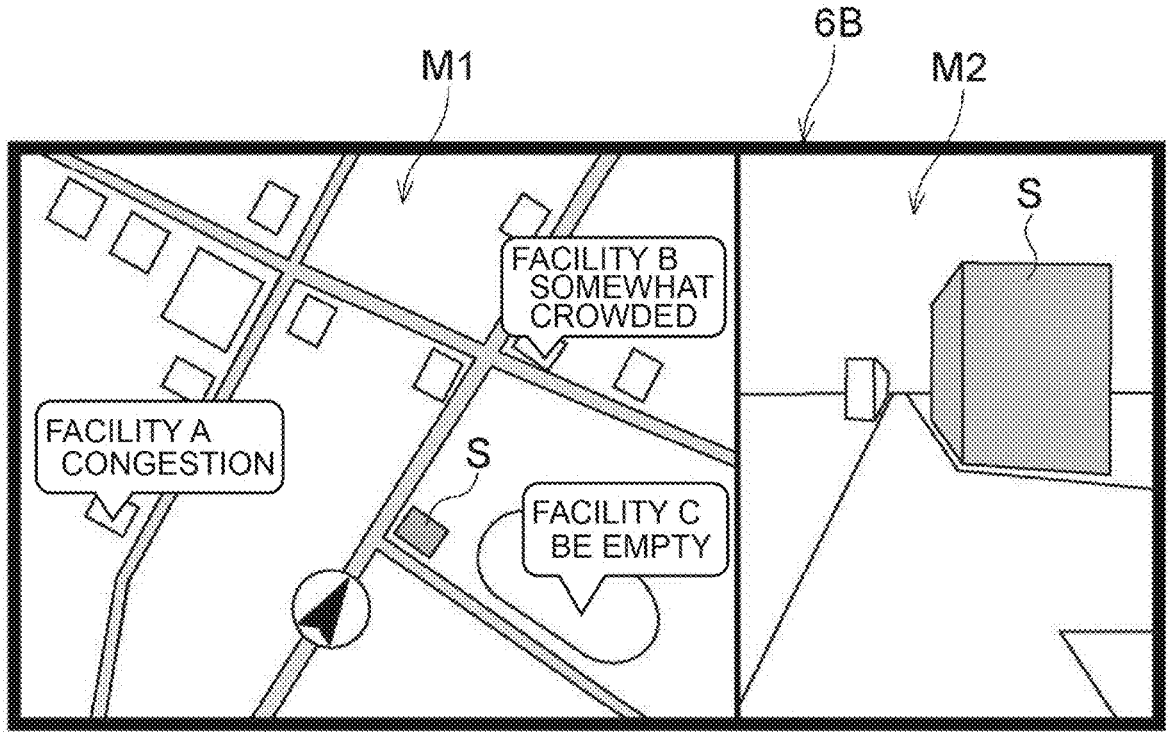
FIG. 4 is a diagram illustrating an exemplary map displayed on the display device.

The map generation unit 39 generates a first map (2D map) M1 as the map illustrated in FIG. 4 based on the determined change point data. The map generation unit 39 may generate the first map M1 on the basis of the determined information of the change point and the visiting information. The map generation unit 39 may generate a second map (street view map) M2 as a map in which camera-images are superimposed on each other based on the determined change point data. The map generation unit 39 may generate a new map by updating the information of the change point to the existing map.

[Flow of Map Generation Process]

Figure 3:
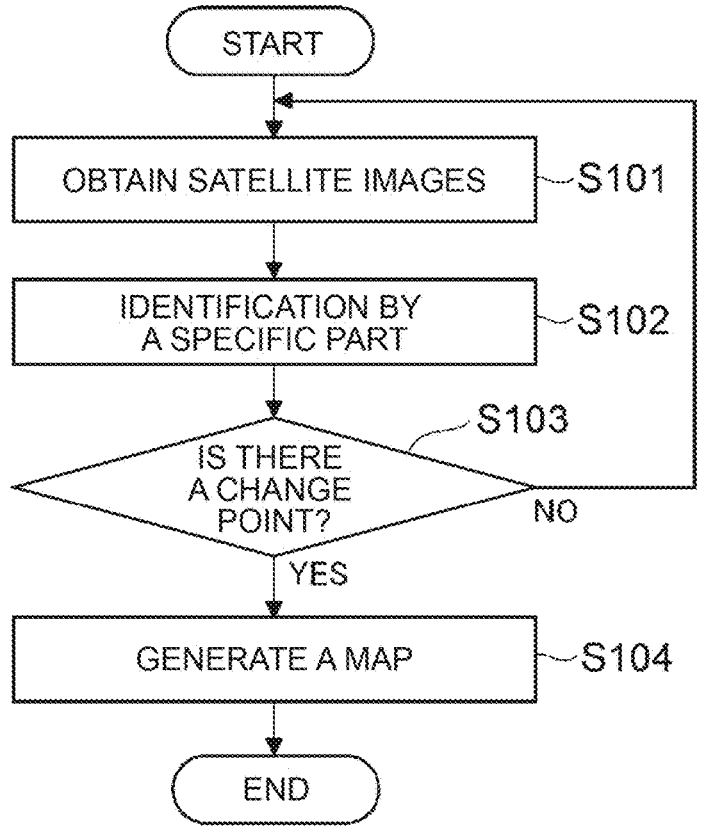
FIG. 3 is a flowchart illustrating a flow of processing performed by the map generation device according to the first embodiment.

As illustrated in FIG. 3, when the map generation process is started, the satellite image acquisition unit 31 acquires a satellite image (S101). Next, the specification unit 34 specifies predetermined data (S102).

Here, when the specification unit 34 is the parking lot specification unit 34A and the vehicle specification unit 34B, the parking lot specification unit 34A specifies the parking lot based on the satellite image, and the vehicle specification unit 34B specifies the vehicle based on the satellite image.

When the specification unit 34 is the character figure information specification unit 34C, the character figure information specification unit 34C specifies the character figure information on the basis of the satellite-image.

When the specification unit 34 is the camp discomfort index specification unit 34D, the camp discomfort index specification unit 34D specifies the camp discomfort index based on the satellite images.

Next, the change point determination unit 35 determines the presence or absence of a change point over time in the satellite-image based on the identification information (S103). If it is determined that there is a point of change with time in the satellite-image (YES in S103), S104 proceeds. On the other hand, if it is determined that there is no change point with time in the satellite-image (NO in S103), S101 returns.

In S104, the map generation unit 39 generates a map based on the information of the determined change point in the specifying information, and ends the process.

[Action]

Incidentally, in the creation of a map, when a store is newly opened, a worker goes to the store, acquires store information, and reflects the store information in the map. Therefore, there is a problem that it is not possible to create a map with good freshness by a simple method.

The map generation device 20 according to the first embodiment includes a satellite image acquisition unit 31 that acquires a satellite image captured by the satellite 2, a change point determination unit 35 that determines a change point of the satellite image with time based on the satellite image, and a map generation unit 39 that generates a map based on information of the determined change point (see FIG. 2).

The change point with time determined based on the satellite image is reflected in the first map M1 and the second map M2 by including the map generation unit 39 that generates the first map M1 and the second map M2 on the basis of the change point with time of the satellite image.

For example, as shown in FIG. 4, when the building S is not shown in the previous satellite image and the building S is shown in the current satellite image, the building S is generated in the existing first map M1.

Therefore, the first map M1 reflecting the change point is generated in real time. Consequently, it is possible to create the first map M1 with good freshness in a simple manner.

The map generation device 20 according to the first embodiment includes a parking lot specification unit 34A that specifies a parking lot based on a satellite image, and a vehicle specification unit 34B that specifies a vehicle based on the satellite image, and the change point determination unit 35 determines the use state of the parking lot as a change point with time in the satellite image based on the specified parking lot and the specified vehicle (see FIG. 2).

The change point determination unit 35 determines the use state of the parking lot as a change point with time in the satellite image based on the identified parking lot and the identified vehicles, and thereby reflects the use state of the parking lot in the first map M1 based on the satellite image.

For example, as illustrated in FIG. 4, in the facility C, when the vehicle is stopped in the parking lot in the past satellite image and the vehicle is not stopped in the parking lot in the present satellite image, it is determined that the use state of the parking lot is "free", and information indicating that the congestion state of the facility C associated with the parking lot is "free" can be added to the first map M1.

Therefore, it is possible to generate a map that reflects the usage status of the facility attached to the parking lot in real time.

Incidentally, in the conventional map, there is a possibility that the information of the newly opened shop is not updated and the closed shop is displayed.

The map generation device 20 according to the first embodiment includes a character figure information specification unit 34C that specifies character figure information based on the satellite image, and the change point determination unit 35 determines a change in the character figure information as a change point with time in the satellite image based on the specified character figure information (see FIG. 2).

The change point determination unit 35 determines a change in the character figure information as a change point with time in the satellite images based on the identified character figure information, and thereby the information of the facilities corresponding to the character figure information (for example, the character information of the signboard) of the change point is reflected in the first map M1.

For example, when the character figure information is "Facility A" in the previous satellite image and the character figure information is "Facility B" in the current satellite image, it is determined that the character figure information has changed from "Facility A" to "Facility B", and the information of Facility B is added to the first map M1.

Therefore, it is possible to set the first map M1 reflecting the information of the facilities in real time. Consequently, it is possible to create the first map M1 with good freshness in a simple manner.

The map generation device 20 according to the first embodiment includes a camp discomfort index specification unit 34D that specifies a camp discomfort index based on the satellite image, and the change point determination unit 35 determines a change point of the camp discomfort degree as a change point of time in the satellite image based on the specified camp discomfort index (see FIG. 2).

Based on the identified camp discomfort index, the change point determination unit 35 determines a change point of the camp discomfort level as a change point with time in the satellite images, thereby generating the first map M1 reflecting the real-time discomfort level of the camp field. Therefore, it is possible to create the first map M1 that reflects the comfortable information of the vehicle accessible campground in real time.

Second Embodiment

The map generation device of the second embodiment is different from the map generation device of the first embodiment in that the flow of the map generation processing is different.

Hereinafter, a flow of the map generation device according to the second embodiment will be described. Explanations of the same or equivalent parts as those described in the first embodiment will be described using the same terms or reference numerals.

[Flow of Map Generation Process]

Figure 5:
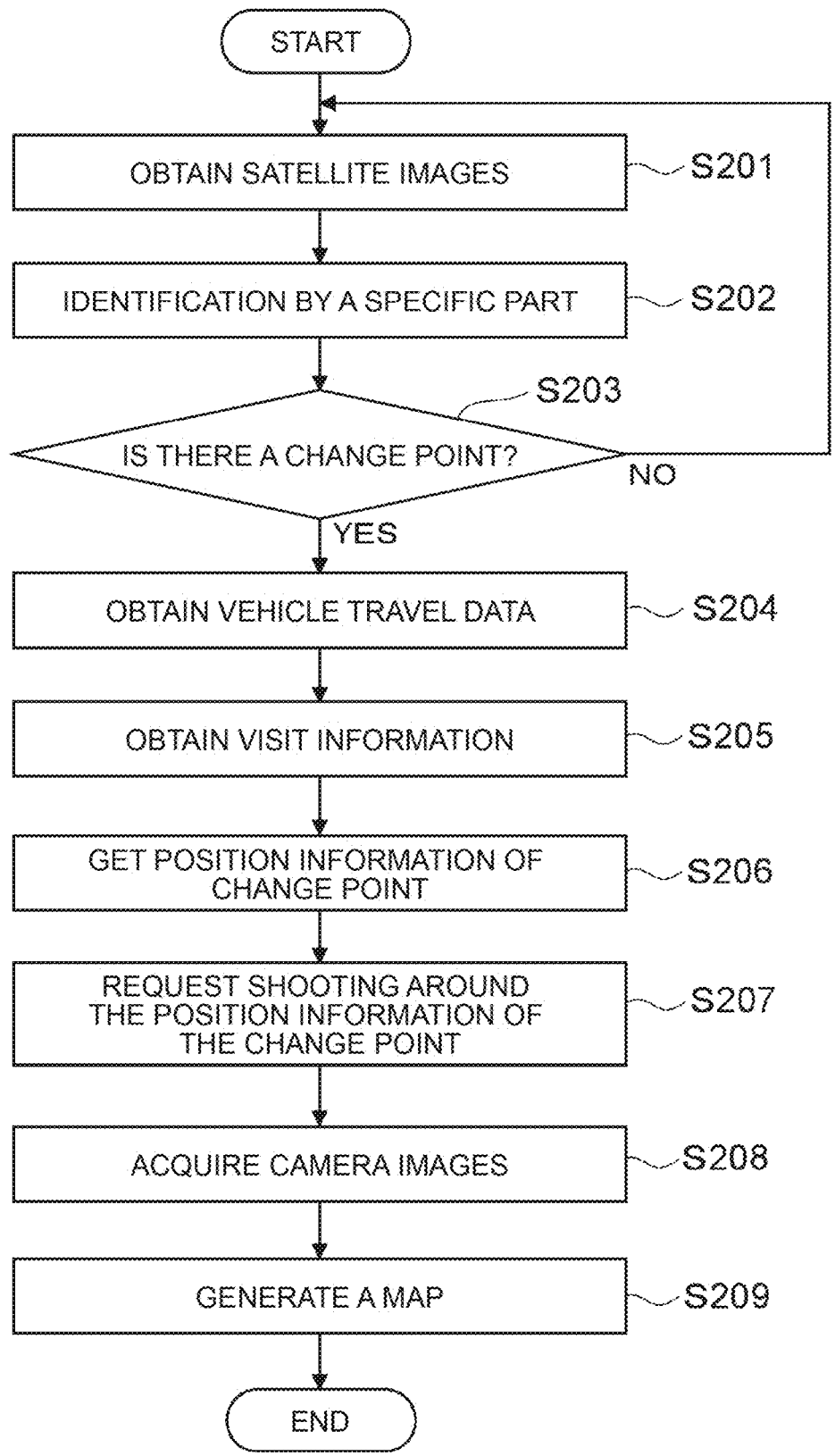
FIG. 5 is a flowchart illustrating a flow of processing performed by the map generation device according to the second embodiment.

As illustrated in FIG. 5, when the map generation process is started, the satellite image acquisition unit 31 acquires a satellite image (S201). Next, the specification unit 34 specifies predetermined data (S202).

Next, the change point determination unit 35 determines the presence or absence of a change point over time in the satellite-image based on the identification information (S203). If it is determined that there is a point of change with time in the satellite-image (YES in S203), S204 proceeds. On the other hand, if it is determined that there is no change point with time in the satellite-image (NO in S203), S201 returns.

In S204, the vehicle travel data acquisition unit 33 acquires travel data of the vehicle 6. Next, the visit information acquisition unit 36 acquires the visit information to the facilities based on the vehicle travel data (S205).

Next, the position information acquisition unit 37 acquires position information of a change point of the satellite-image (S206). Next, the requesting unit 38 requests the vehicles 6 around the change point to capture an image around the change point based on the position information (S207). Next, the camera image acquisition unit 32 acquires a camera image captured by the camera 6A mounted on the vehicle 6 in response to a request from the requesting unit 38 (S208).

Next, the map generation unit 39 generates the first map M1 on the basis of the determined information of the change point and the visiting information to the facilities, generates the second map M2 on which the camera images are superimposed on the basis of the determined information of the change point (S209), and ends the process.

[Action]

The map generation device 20 according to the second embodiment includes a vehicle travel data acquisition unit 33 that acquires vehicle travel data, and a visit information acquisition unit 36 that acquires visit information to a facility based on the vehicle travel data, and the map generation unit 39 generates the first map M1 based on the visit information (see FIG. 2).

The map generation unit 39 generates the first map M1 based on the visit information, thereby generating the first map M1 reflecting the location where the vehicles frequently visit. Therefore, it is possible to set the first map M1 reflecting the store that is being opened. Consequently, a first map M1 with better freshness can be created.

The map generation device 20 according to the second embodiment includes a position information acquisition unit 37 that acquires position information of a change point, a requesting unit 38 that requests the vehicle 6 around the change point to capture an image around the change point based on the position information, and a camera image acquisition unit 32 that acquires a camera image of a camera 6A mounted on the vehicle, and the map generation unit 39 generates a second map M2 in which the camera image is superimposed based on the determined information of the change point (see FIG. 2).

The map generation unit 39 generates the second map M2 based on the camera image captured by the camera 6A at the change point, thereby generating the second map M2 using the camera image at the change point. Therefore, the second map M2 reflecting the camera-image of the change point is generated in real time. Consequently, the second map M2 having a good freshness can be created in a simple manner.

Note that other configurations and operational effects are substantially the same as those of the first embodiment, and thus description thereof will be omitted.

The map generation device according to the embodiment has been described above based on the first embodiment and the second embodiment. However, the specific configuration is not limited to these embodiments, and changes in design and the like are allowed without departing from the gist of the disclosure according to each claim of the claims.

In the first embodiment and the second embodiment, various processors other than CPU 21 may execute the process executed by CPU 21 reading the program. Examples of the processor include a Programmable Logic Device (PLD) in which a circuit configuration can be changed after manufacturing of Field-Programmable Gate Array (FPGA), and the like, and a dedicated electric circuit that is a processor having a circuit configuration designed exclusively for executing a particular process such as Application Specific Integrated Circuit (ASIC), and the like. In addition, the above processes may be executed by one of these various processors, or may be executed by a combination of two or more processors of the same kind or different kinds. For example, the processes may be executed by a plurality of FPGAs, a combination of the CPU and the FPGA, and the like. Furthermore, the hardware structure of each of the various processors is, more specifically, an electric circuit in which circuit elements such as semiconductor elements are combined.

In the first embodiment and the second embodiment, various data are stored in the storage unit 24, but the present disclosure is not limited thereto. For example, a non-transitory recording medium such as Compact Disk (CD), Digital Versatile Disk (DVD), and Universal Serial Bus (USB) memories may be used as the storage unit. In this case, various programs, data, and the like are stored in these recording media.

The flow of the processing described in the first embodiment and the second embodiment is an example, and unnecessary steps may be deleted, new steps may be added, or the processing order may be changed without departing from the gist.

What is claimed is:

1. A map generation device comprising:
a processor; and
a memory storing program instructions that cause the processor to acquire a satellite image captured by an artificial satellite;
identify a camping place and specify a camp discomfort index based on the satellite image;
determine a change point of a camp discomfort degree with time in the satellite image based on the satellite image, wherein the camp discomfort degree that is determined based on the camp discomfort index;
generate a map based on information of the determined change point;
acquire position information of the determined change point;
request, based on the acquired position information, a vehicle around the determined change point to capture an image around the determined change point;
acquire a camera image of a camera mounted on the vehicle; and
superimpose the camera image on the map based on the information of the determined change point and include the camp discomfort degree of the camping place in real time.

2. The map generation device according to claim 1, wherein the program instructions further cause the processor to
identify a parking lot based on the satellite image;
identify a vehicle based on the satellite image; and
determines determine a usage state of the parking lot as the change point with time in the satellite image based on the identified parking lot and the identified vehicle.

3. The map generation device according to claim 1, wherein the program instructions further cause the processor to
specify character figure information based on the satellite image; and
determine a change in the character figure information as the change point with time in the satellite image based on the specified character figure information.

4. The map generation device according to claim 1, wherein the program instructions further cause the processor to
acquire vehicle travel data;
acquire visit information to a facility based on the vehicle travel data; and
generate the map based on the visit information.

5. The map generation device according to claim 1, wherein
the camp discomfort index is specified based on one or more of congestion conditions, vehicle spacing, availability of shade, air temperature, humidity, soil moisture content, wind speed, and weather information.

\* \* \* \* \*